US011063932B1

(12) United States Patent
Penov et al.

(10) Patent No.: US 11,063,932 B1
(45) Date of Patent: *Jul. 13, 2021

(54) AUTHENTICATING DEVICES TO A NETWORK

(71) Applicant: FACEBOOK, INC., Menlo Park, CA (US)

(72) Inventors: Francislav Penov, Kirkland, WA (US); Damian Kowalewski, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,511

(22) Filed: Feb. 24, 2020

Related U.S. Application Data

(63) Continuation of application No. 15/199,292, filed on Jun. 30, 2016, now Pat. No. 10,581,831.

(51) Int. Cl.
*H04L 29/06* (2006.01)
*H04W 12/06* (2021.01)
(Continued)

(52) U.S. Cl.
CPC .......... *H04L 63/083* (2013.01); *H04L 41/048* (2013.01); *H04L 67/02* (2013.01);
(Continued)

(58) Field of Classification Search
CPC ..... H04L 63/083; H04L 67/02; H04L 41/048; H04W 4/029; H04W 12/06; H04W 84/12
See application file for complete search history.

(56) References Cited

U.S. PATENT DOCUMENTS

2005/0033994 A1 2/2005 Suzuki
2006/0236376 A1* 10/2006 Liu .................... H04L 63/0236
726/4
(Continued)

OTHER PUBLICATIONS

Assed Jehangiretal., "A Security Architecture for Personal Networks," 2006, IEEE, pp. 1-8. (Year: 2006).*
(Continued)

*Primary Examiner* — Luu T Pham
*Assistant Examiner* — Canh Le
(74) *Attorney, Agent, or Firm* — Artegis Law Group, LLP

(57) ABSTRACT

In one embodiment, a method includes receiving, from a device via a wireless signal, a request to access a WLAN of a router, the request including a device identifier. The provisioning agent may be within wireless ranges of the device and of the router. The provisioning agent may request, from an authentication server, a password for the device. The password may be uniquely generated by the authentication server for the device. The provisioning agent may receive the password from the authentication server. The provisioning agent may send, to the router, the password and the device identifier. The provisioning agent may receive, from the router, an indication that the router has verified the password with the authentication server. The router may store the device identifier in association with the password. The provisioning agent may send, to the device, the password. The password may authenticate the device to the router.

18 Claims, 6 Drawing Sheets

(51) Int. Cl.
  *H04L 29/08* (2006.01)
  *H04L 12/24* (2006.01)
  *H04W 4/029* (2018.01)
  *H04W 84/12* (2009.01)

(52) U.S. Cl.
  CPC ........... *H04W 4/029* (2018.02); *H04W 12/06* (2013.01); *H04W 84/12* (2013.01)

(56) References Cited

U.S. PATENT DOCUMENTS

| | | | |
|---|---|---|---|
| 2007/0022473 A1* | 1/2007 | Hird | H04L 9/32 |
| | | | 726/9 |
| 2007/0081477 A1* | 4/2007 | Jakkahalli | H04L 12/4645 |
| | | | 370/310 |
| 2007/0197206 A1 | 8/2007 | Olson et al. | |
| 2010/0198971 A1 | 8/2010 | Callaway et al. | |
| 2010/0293570 A1* | 11/2010 | Teraoka | H04L 63/0428 |
| | | | 725/31 |
| 2012/0096159 A1 | 4/2012 | Short et al. | |
| 2013/0191416 A1* | 7/2013 | Lee | G06F 16/2457 |
| 2013/0198383 A1* | 8/2013 | Tseng | H04L 63/0876 |
| | | | 709/225 |
| 2014/0040244 A1* | 2/2014 | Rubinstein | G06F 16/248 |
| | | | 707/722 |
| 2014/0280941 A1* | 9/2014 | Maguire | G06Q 50/01 |
| | | | 709/225 |
| 2015/0134956 A1 | 5/2015 | Stachura et al. | |
| 2015/0215310 A1* | 7/2015 | Gill | H04L 63/0838 |
| | | | 726/7 |
| 2016/0262205 A1* | 9/2016 | Flynn | H04W 4/203 |
| 2017/0126640 A1* | 5/2017 | Vincent | H04L 63/10 |
| 2017/0178137 A1 | 6/2017 | Pachouri et al. | |

OTHER PUBLICATIONS

A. Jehangir, "Evaluating Secure Cluster Formation in Personal Networks," 2007, IEEE, pp. 3136-3142. (Year: 2007).*

Jehangir et al., "A Security Architecture for Personal Networks", IEEE, 2006, pp. 1-8.

Jehangir et al., "Evaluating Secure Cluster Formation in Pesonal Networks", IEEE, 2007, pp. 3136-3142.

* cited by examiner

AUTHENTICATING DEVICES TO A NETWORK

CROSS-REFERENCE TO RELATED APPLICATIONS

This application is a continuation of the co-pending U.S. patent application titled, "AUTHENTICATING DEVICES TO A NETWORK," filed on Jun. 30, 2016 and having Ser. No. 15/199,292. The subject matter of this related application is hereby incorporated herein by reference.

TECHNICAL FIELD

This disclosure generally relates to authentication of devices to a network, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a provisioning agent (e.g., a client system) may authenticate one or more devices, each device being capable of wireless-network connectivity, to a wireless router associated with a wireless local area network (WLAN). The provisioning agent may detect a request being broadcast (e.g., as a BLUETOOTH signal) by a device that has been turned on and that is proximate to the provisioning agent (e.g., within wireless range of the provisioning agent). The request received by the provisioning agent may include a device identifier of the device (e.g., a media access control (MAC) address). The provisioning agent may request a device-specific password for the device from an authentication server. The provisioning agent may generate the device-specific password. The provisioning agent may send the password, which was uniquely-generated for the device, to the router with the device identifier. The router may verify the password and the device identifier with the authentication server. The router may send confirmation to the provisioning agent that the password is verified for the device. The provisioning agent may then send the password to the device, which may use it to connect to the WLAN via the router. Any suitable number of devices may be connected to the WLAN via the router, each having a unique password generated in any suitable manner. Because each device is associated with a unique password, a malicious user may be prevented from using a stolen or hacked password to connect to a private WLAN. As an example and not by way of limitation, a malicious user may intercept the transmission of the password from the provisioning agent to the device and try to access the WLAN via the router using the password. The router may prevent the malicious user from accessing the WLAN, because the router may require both the correct password and the correct device identifier. The malicious user may be using a different device to attempt to connect to the WLAN, and the different device would have a different device identifier. Thus, the router would not grant access to the malicious user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
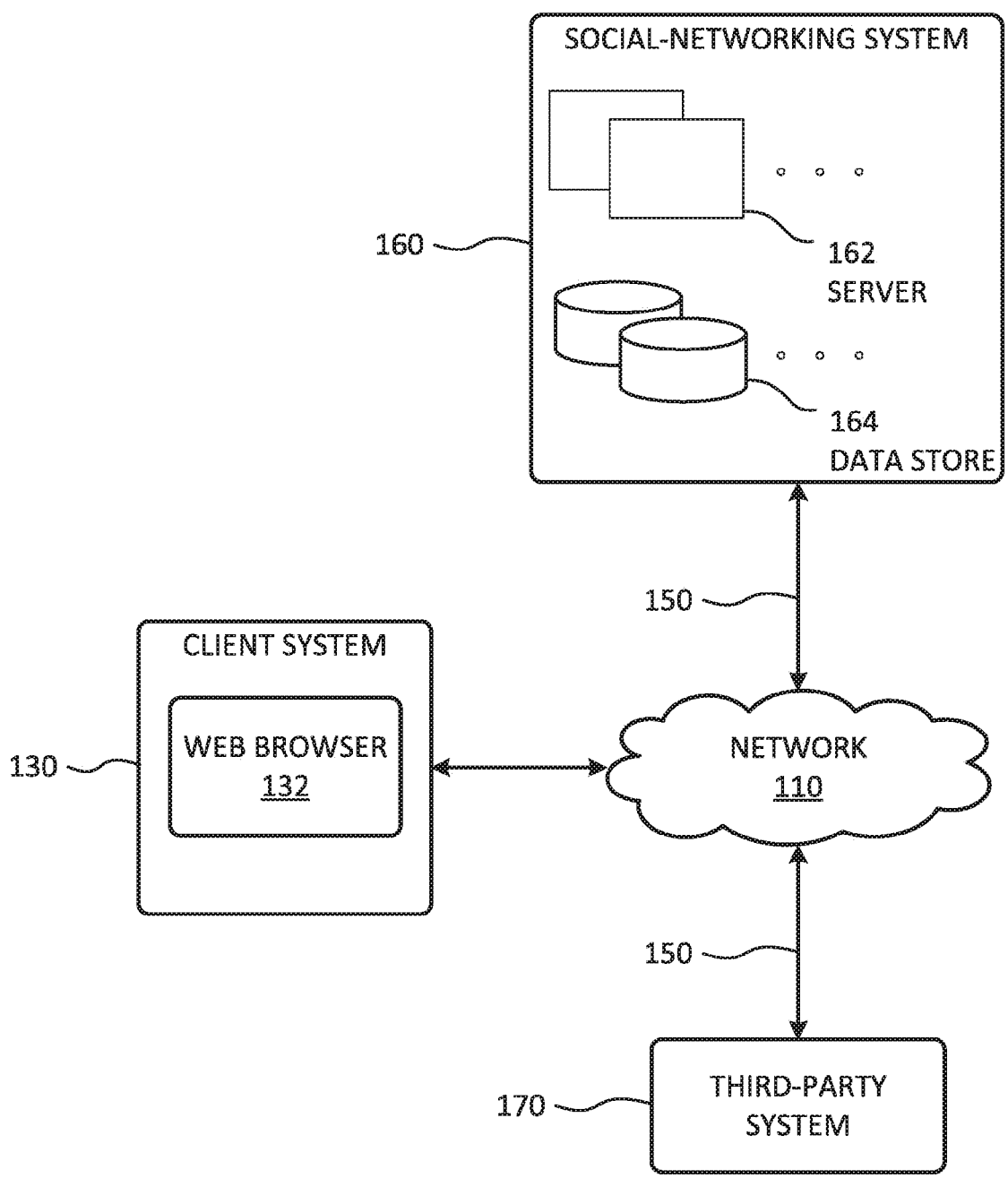
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
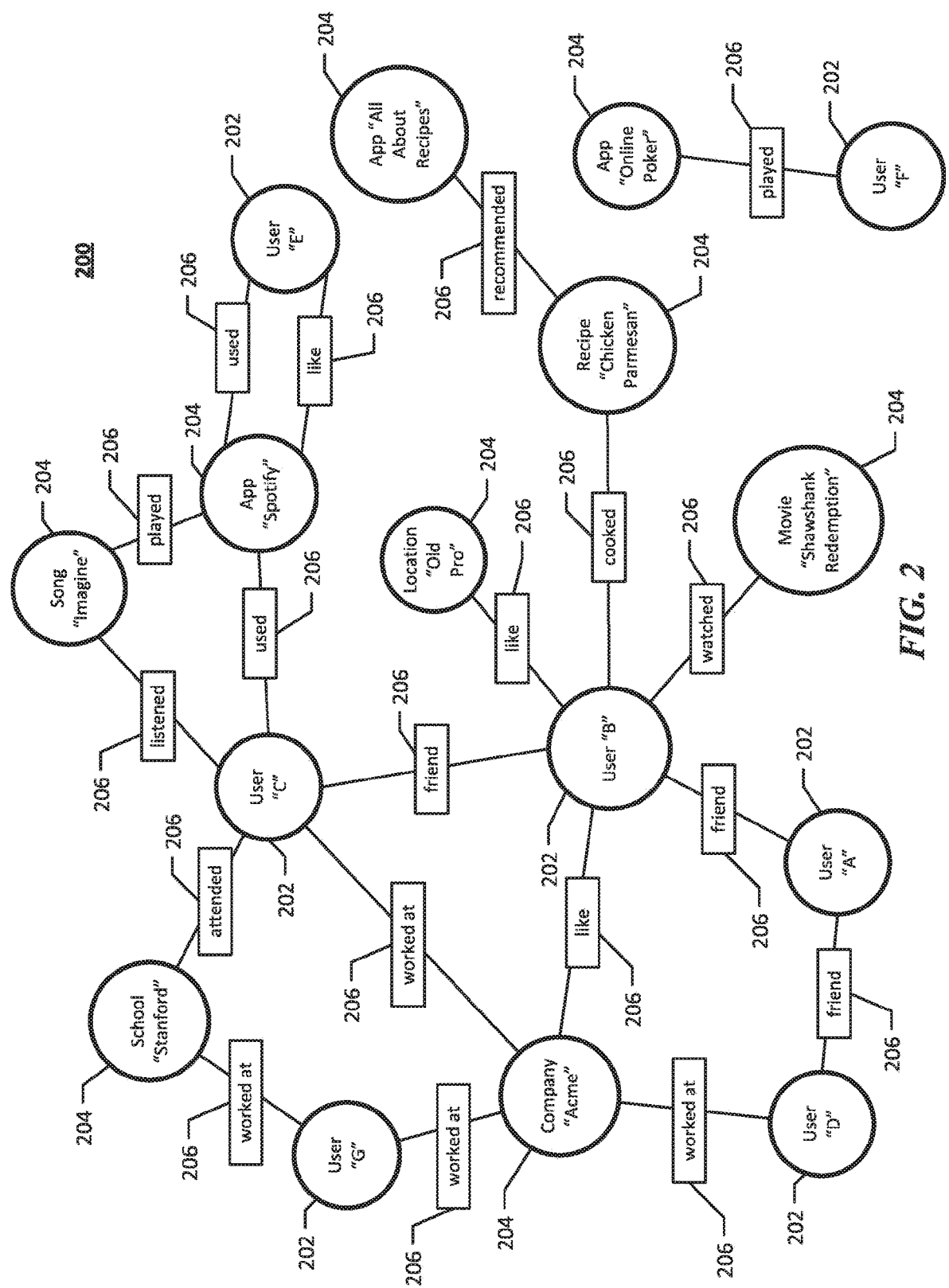
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Authenticating a Device to a Router

Particular embodiments facilitate the authentication of one or more devices to a wireless router (hereinafter simply "router") using a provisioning agent so that the devices may access a private network of the router. As used herein, a device may be any device suitable for accessing a private network of the router (e.g., connecting to the internet via the router). A device may be able to communicate wirelessly with the provisioning agent. A device may send and receive wireless communications via, for example, radio-frequency identification, near-field communication, ultrasonic waves, BLUETOOTH (e.g., short-range radio frequencies), BLUETOOTH low energy, or any other suitable wireless communication method, particularly short-range wireless communication methods (e.g., less than approximately 300 feet). A device may have any of the hardware or software features of the types described in U.S. patent application Ser. No.

14/460,886, titled "Bluetooth Crowd-Sourced Triangulation," filed 15 Aug. 2014; U.S. patent application Ser. No. 14/460,880, titled "Bluetooth Transmission Security Pattern," filed 15 Aug. 2014; and U.S. patent application Ser. No. 14/460,891, titled "Bluetooth Beacon Protocol," filed 15 Aug. 2014; U.S. patent application Ser. No. 13/416,975, titled "Dynamic Processor Duty Cycle Determination Based on Geographic Positioning Signals," filed 9 Mar. 2012; U.S. patent application Ser. No. 13/417,013, titled "Location Tracking for Geographic Positioning Capable Devices," filed 9 Mar. 2012; and U.S. patent application Ser. No. 13/431,842, titled "Dynamic Geographic Beacons for Geographic Positioning Capable Devices," filed 27 Mar. 2012, each of which is incorporated by reference herein. As used herein, a provisioning agent may be able to communicate wirelessly with one or more devices, the router, and an authentication server. A provisioning agent may be, as an example and not by way of limitation, a client system 130. As used herein, a router may be any suitable networking device suitable for forwarding data packets between computer networks. The router may have any suitable number of antennas for sending and receiving wireless communications. The router may have functionality for providing connectivity to a network to any suitable number of devices. The router may be capable of communicating wirelessly with the one or more devices, the provisioning agent, and the authentication server. When a device is in a wireless range of a router (e.g., a device may be in range of a router if it is in range of at least one antenna of the router and can receive a signal from the at least one antenna) and when the device is in a wireless range of the provisioning agent (e.g., a device may be in range of a provisioning agent if it is within BLUETOOTH range of the provisioning agent), the device may be authenticated to the router based on wireless communications between the device, the provisioning agent, the authentication server, and the router. The device may be automatically authenticated to the router in the background, or confirmation from the user (e.g., a response to a prompt displayed on the provisioning agent) may be required before device is authenticated to the router. Once authenticated to the router, the device may be able to access (e.g., connect to) a private network of the router. Although this disclosure describes authenticating a device to a router in a particular manner, this disclosure contemplates establishing any suitable authentication in any suitable manner.

Figure 3:
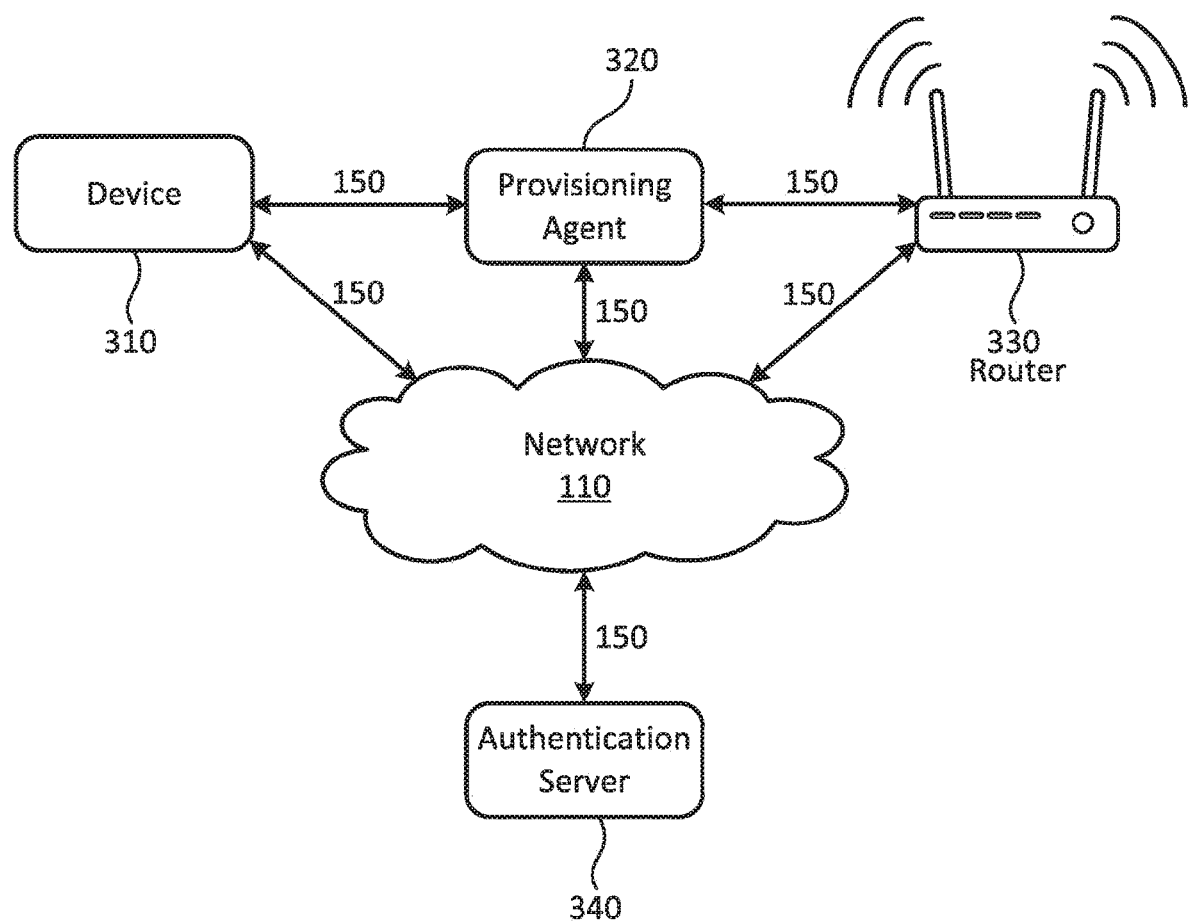
FIG. 3 illustrates an example router environment.

FIG. 3 illustrates an example router environment 300. Router environment 300 includes a device 310, a provisioning agent 320, a router 330, and an authentication server 340, each connected to a network 110. Router 330 may be communicatively coupled to provisioning agent 320 by a wireless connection. Device 310 may be communicatively coupled to provisioning agent 320 by a wired or wireless connection. Device 310 and router 330 are shown as connected to each other by provisioning agent 320. Although FIG. 3 illustrates a particular arrangement of device 310, provisioning agent 320, router 330, authentication server 340, and network 110, this disclosure contemplates any suitable arrangement of device 310, provisioning agent 320, router 330, authentication server 340, and network 110. As an example and not by way of limitation, device 310 and router 330 may be connected to each other directly, bypassing provisioning agent 320 and network 110. Although FIG. 3 illustrates one device 310, any suitable number of devices 310 may be authenticated to router 330. As described above, in connection with FIG. 1, links 150 may connect device 310, provisioning agent 320, router 330, and authentication server 340 to network 110 or to each other.

In particular embodiments, device 310 may be any suitable device with functionality for connecting to a network (e.g., a device capable of connecting to a private network of router 330). One or more devices 310 may be situated at designated locations within an area covered by (i.e., within wireless range of) a private network of router 330. In particular embodiments, the private network of router 330 may be a wireless local area network (WLAN). Router 330 may be associated with (e.g., owned or controlled by) a user of social-networking system 160. When device 310 is first powered on (e.g., by the user who owns/controls the WLAN and router 330), it may automatically enter a broadcast mode. While in broadcast mode, device 310 may broadcast a request to access a network (e.g., WLAN) of router 330. The request may include a device identifier of device 310. The device identifier may be, as an example and not by way of limitation, a MAC address, a serial number, any other identifier that is unique to the device, or any combination thereof. The request may be broadcast by device 310 for a predetermined period of time (e.g., a five-minute window). Device 310 may broadcast the request using, as an example and not by way of limitation, a short-range radio frequency (e.g., BLUETOOTH). Device 310 may be within a wireless range of provisioning agent 320. Device 310 may also be within a wireless range of router 330.

In particular embodiments, the request being broadcast by device 310 may be received by provisioning agent 320. As an example and not by way of limitation, provisioning agent 320 may be a client system 130. As another example and not by way of limitation, the request being broadcast by device 310 may be received by an application running on provisioning agent 320. In the same example and not by way of limitation, the application may be a native application associated with social-networking system 160. After receiving the request from device 310, provisioning agent 320 may determine that device 310 is requesting access to a private network of router 320 (i.e., based on the received request). Provisioning agent 320 may be associated with router 330 (e.g., provisioning agent 320 may be registered to router 330 and be able to control access to router 330). In particular embodiments, a single user may own or control provisioning agent 320 and router 330. Provisioning agent 320 may, in response to receiving the request from device 310, send a request to authentication server 340 (e.g., via network 110). The request sent by provisioning agent 320 to authentication server 340 may be a request for a password for device 310. The password may be uniquely-generated for device 310. In particular embodiments, authentication server 340 may generate the unique password for device 310. In particular embodiments, the authentication server 340 may be a server 162 of social-networking system 160, and social-networking system 160 may generate the unique password for device 310. In particular embodiments, provisioning agent 320 may request the device-specific password from router 330. In particular embodiments, router 330 may generate the unique password for device 310. The password may be, as an example and not by way of limitation, an alphanumeric sequence or any suitable randomly-generated sequence or token. For each new device 310 that requests access to the private network of router 330 (i.e., by broadcasting a request that is received at provisioning agent 320), a new, unique password may be generated that is specific to that device 310. In this manner, no two devices will be assigned the same password.

Provisioning agent 320 may receive the password for device 310 from authentication server 340. In particular embodiments, authentication server 340 may be a server 162 of social-networking system 160. In order to receive the password from social-networking system 160, a native application associated with social-networking system 160 may be running on the user's client system 130, and the user of client system 130 may be logged into an online social network via the native application (e.g., Facebook® for iPhone®). In particular embodiments, provisioning agent 320 may send the received password for device 310 and the device identifier of device 310 (i.e., the device identifier received from device 310) to router 330. Router 330 may then send a request for verification of the password for device 310 and the device identifier of device 310 to authentication server 340. Authentication server 340 may confirm both that the password is correct (i.e., based on having generated the password) and that the password is paired with (i.e., associated with) the correct device identifier of the correct device 310. That is, authentication server 340 may verify that the password it has received from router 330 is the password that it generated for the device identifier that it receives from router 330. If the password is correct and paired with the correct device identifier, authentication server 340 may send a verification to router 330 in response to its request for verification. After receiving the verification from authentication server 340, router 330 may store the device identifier of device 310 in association with the password for device 310. Router 330 may send an indication that it has verified the password for device 310 with authentication server 340. Router 330 may also send an indication that it has verified that the password for device 310 and the associated device identifier for device 310 with authentication server 340.

In response to receiving the indication of verification from router 330, provisioning agent 320 may send, to device 310, the password for device 310. Device 310 may then use the password to connect to the private network of router 330. As an example and not by way of limitation, device 310 may log in to a private network (e.g., a WLAN) of router 330 using its device identifier and the uniquely-generated password that it received from provisioning agent 320. In particular embodiments, this process of requesting, generating, verifying, and sending a unique password for a unique device 310 may be repeated for any suitable number of devices 310 attempting to access a network (e.g., WLAN) of router 330. In particular embodiments, provisioning agent 320 (e.g., an application running on provisioning agent 320) may store a log of verified passwords and associated devices 310. Because each device 310 uses a unique password that is specifically associated with the respective device identifier of the particular device 310 to access the private network of router 330, router 330 may be able to easily detect and identify a malicious user attempting to access the private network of router 330. As an example and not by way of limitation, a malicious user may intercept the transmission of a password from provisioning agent 320 to device 310 and attempt to use the password to log in to the private network of router 330 on a different device (e.g., a device owned by the malicious user). The malicious user would be unable to log in to the private network of router 330, because the device identifier of the different device would not match that stored in association with the stolen password by router 330. In particular embodiments, upon detecting a potentially malicious user or device trying to access the private network of router 330, router 330 may send a notification to provisioning agent 320. An application running on provisioning agent 320 may prompt the user to confirm that the attempted access is improper. Once the router 330 receives confirmation that the access attempt is improper, router 330 may delete the stolen password from its storage. In particular embodiments, router 330 may also send notifications to provisioning agent 320 based on usage associated with a password and associated device identifier. As an example and not by way of limitation, router 330 may determine that a particular password and device identifier combination has been connected to the private network of router 330 and is consuming an improper amount of data (e.g., a device may be sprinkler that usually uses a small amount of data, and router 330 may detect that the data usage of the device has quadrupled). In particular embodiments, provisioning agent 320 may be a client system 130 of a user, and the user may specify in settings of an application running on client system 130 what notifications he wishes to receive from router 330. Router 330 may also police and erase passwords from its storage based on detected, potentially malicious use without user interaction (i.e., without confirmation from a user at provisioning agent 320).

Although this disclosure describes and illustrates particular embodiments of FIG. 3 as being implemented by a provisioning agent 320, this disclosure contemplates any suitable embodiments of FIG. 3 occurring on any suitable interface and as being implemented by any suitable platform or system. As an example, and not by way of limitation, particular embodiments of FIG. 3 may be implemented by an application (e.g., a native application) running on provisioning agent 320. As an example, and not by way of limitation, provisioning agent 320 may be client system 130, and particular embodiments of FIG. 3 may be implemented by an application (e.g., a native application) running on client system 130. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Prompt and Confirmation

In particular embodiments, the process of authenticating a device 310 to router 330 may be seamless (i.e., it may not require any user input in order for the device 310 to be authenticated to router 330). In particular embodiments, as described in connection with FIG. 4, user input responding to a prompt may be required in order to initiate, complete, or both, the authentication of the device 310 to router 330.

Figure 4:
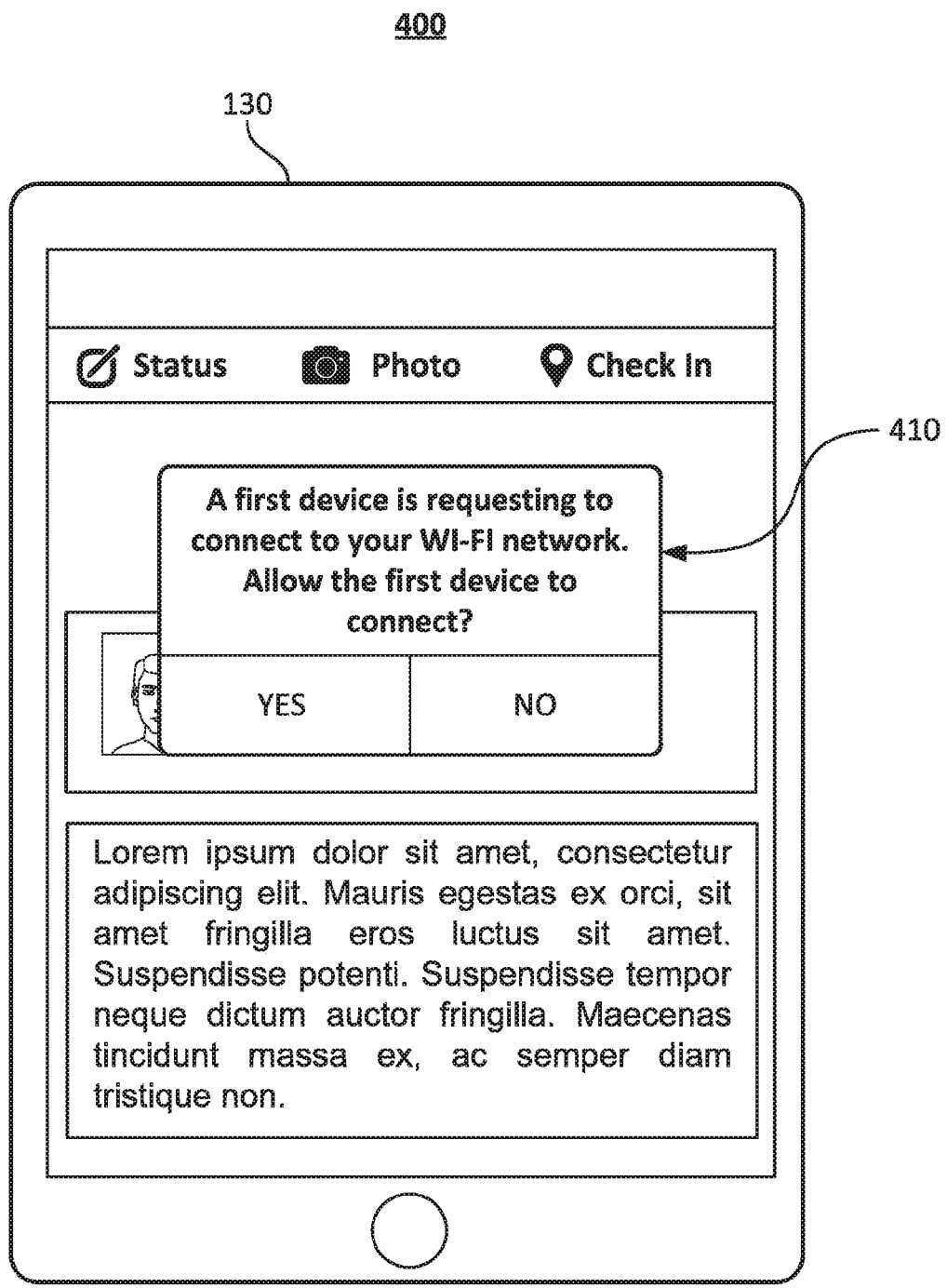
FIG. 4 illustrates an example view of a prompt to allow a device access to a network displayed on a client system.

FIG. 4 illustrates an example view of a prompt 410 to allow a device 310 access to a network displayed on a client system 130. In particular embodiments, the receipt, by provisioning agent 320, of the request to access the private network of router 330 from device 310 may cause an application running on provisioning agent 320 to generate prompt 410 for display at an interface of provisioning agent 320. Provisioning agent 320 is depicted in FIG. 4, by way of illustration and not by way of limitation, as a client system 130. Prompt 410 may be a request for confirmation of authentication of device 310 to router 330. As an example and not by way of limitation, prompt 410 may request confirmation that the device 310 should be allowed to access the private network of router 330. The requested confirmation may be, as an example and not by way of limitation, a binary answer to a question posed by the prompt (e.g., "yes" or "no" in response to a request to authenticate device 310 to router 330). The requested confirmation may be inputted by the user at the client system 130. When the requested authentication is received at the application running on client system 130, the application may continue the authentication process by requesting a password for the device from authentication server 340.

In particular embodiments, a user may specify, in settings, whether or not and how a prompt 410 may be displayed. As an example and not by way of limitation, the application running on client system 130 may be a native application associated with social-networking system 160, and prompt 410 may be displayed in an interface of the native application (e.g., in a news feed). Although described and depicted in a particular way, it will be understood that this is by way of illustration not by way of limitation, and prompt 410 may be any suitable type of prompt. As an example and not by way of limitation, prompt 410 may be a push notification provided on a lock screen of client system 130 or hovering over any suitable screen of client system 130. As another example and not by way of limitation, prompt 410 may be a type of reaction card, which may be presented to a user, of the type described in U.S. patent application Ser. No. 14/466,269, titled "Generating Cards in Response to User Actions on Online Social Networks" filed 22 Aug. 2014, which is incorporated herein by reference.

Although this disclosure describes and illustrates particular embodiments of FIG. 4 as being implemented by a client system 130, this disclosure contemplates any suitable embodiments of FIG. 4 occurring on any suitable interface and as being implemented by any suitable platform or system. As an example, and not by way of limitation, particular embodiments of FIG. 4 may be implemented by any suitable provisioning agent 320. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
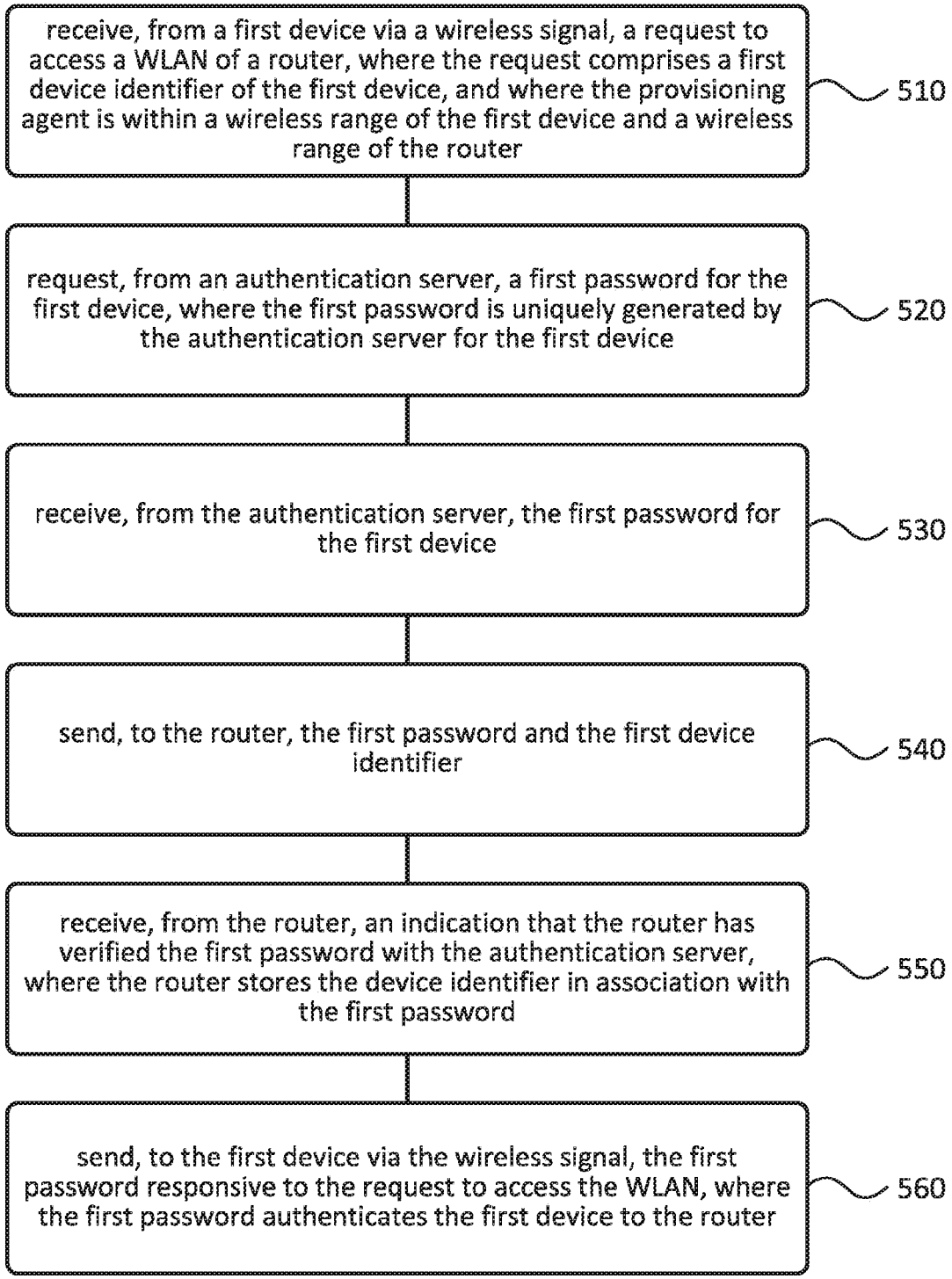
FIG. 5 illustrates an example method for authenticating a first device to a router.

FIG. 5 illustrates an example method for authenticating a first device 310 to a router 330. The method may begin at step 510, where an application running on a provisioning agent 320 may receiving, from a first device 310 via a wireless signal, a request to access a wireless local area network (WLAN) of a router 330, wherein the request comprises a first device identifier of first device 310, and where provisioning agent 320 is within a wireless range of the first device 310 and a wireless range of the router 320. At step 520, the application running on provisioning agent 320 may request, from an authentication server 340, a first password for the first device 310, where the first password is uniquely generated by the authentication server 340 for first device 310. At step 530, the application running on provisioning agent 320 may receive, from authentication server 340, the first password for first device 310. At step 540, the application running on provisioning agent 320 may send, to router 330, the first password and the first device identifier. At step 550, the application running on provisioning agent 320 may receive, from router 330, an indication that router 330 has verified the first password with authentication server 340, where router 330 stores the device identifier in association with the first password. At step 560, the application running on provisioning agent 320 may send, to first device 310 via the wireless signal, the first password responsive to the request to access the WLAN, where the first password authenticates first device 310 to router 330.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for authenticating a first device 310 to a router 330, including the particular steps of the method of FIG. 5, this disclosure contemplates any suitable method for authenticating a first device 310 to a router 330, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
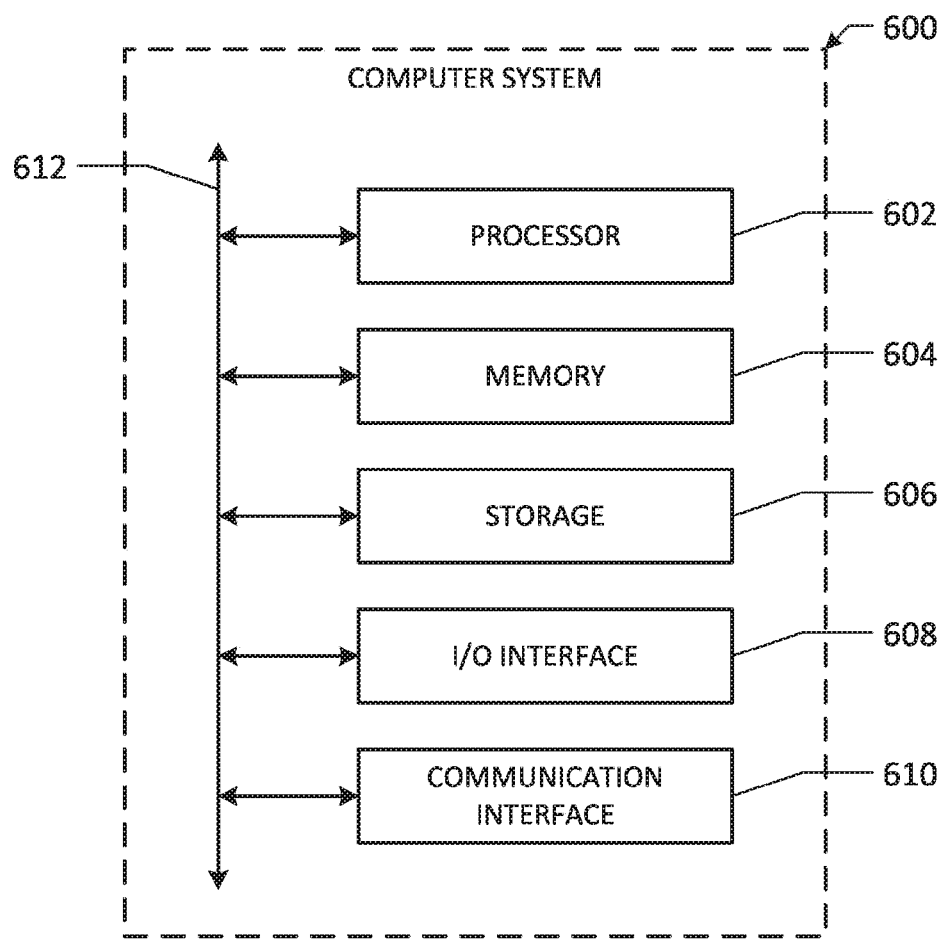
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    receiving, at a provisioning agent from a first device, a first request to access a wireless local area network (WLAN) of a router, wherein the provisioning agent is separate from the router, wherein the first request comprises a first device identifier of the first device, wherein the provisioning agent is within a first wireless range of the first device and a second wireless range of the router, and wherein the provisioning agent and the first device are different devices;
    displaying, at an interface of the provisioning agent, a notification requesting confirmation by a user that the first device is allowed to access the WLAN of the router;
    requesting, after receiving the confirmation from the user that the first device is allowed to access the WLAN of the router at the provisioning agent from an authentication server, a first unique password generated by the authentication server for the first device to access the WLAN of the router, wherein the first unique password is an alphanumeric sequence unique to the first device or a randomly-generated token unique to the first device;
    receiving, at the provisioning agent from the authentication server, the first unique password generated by the authentication server for the first device;
    sending, from the provisioning agent to the router, the first unique password and the first device identifier;
    receiving, at the provisioning agent from the router, a first indication that the router has verified that the first unique password is correct; and
    sending, from the provisioning agent to the first device, the first unique password responsive to the first request to access the WLAN, wherein the first unique password allows the first device to be automatically authenticated with the router.

2. The method of claim 1, wherein the provisioning agent is a client system of the user.

3. The method of claim 2, wherein:
    the user is logged into an online social network via an application running on the client system; and
    the authentication server is a server of the online social network.

4. The method of claim 1, wherein the first device identifier is a media access control address.

5. The method of claim 1, further comprising receiving, at the provisioning agent from the router, an additional confirmation from the authentication server that the first unique password is correctly paired with the first device identifier.

6. The method of claim 1, further comprising:
    receiving, at the provisioning agent from a second device via a wireless signal, a second request to access the WLAN of the router, wherein the second request comprises a second device identifier of the second device, wherein the provisioning agent is within a third wireless range of the second device and the router, and wherein the provisioning agent and the second device are different;

requesting, at the provisioning agent from the authentication server, a second unique password for the second device to access the WLAN of the router, wherein the second unique password is uniquely generated by the authentication server specifically and exclusively for the second device;

receiving, at the provisioning agent from the authentication server, the second unique password for the second device;

sending, from the provisioning agent to the router, the second unique password and the second device identifier;

receiving, at the provisioning agent from the router, a second indication that the router has verified the second unique password with respect to the second device identifier with the authentication server, wherein the router stores the second device identifier in association with the second unique password; and sending, from the provisioning agent to the second device via the wireless signal, the second unique password responsive to the second request to access the WLAN, wherein the second unique password allows the second device to be automatically authenticated with the router.

7. The method of claim 1, further comprising:

receiving, at the provisioning agent from the router, an additional notification of an attempt by a potentially malicious device to access the WLAN of the router using the first unique password, wherein the additional notification is generated based on a stored association of the first unique password with the first device identifier;

receiving, at the provisioning agent, an additional confirmation that the attempt is improper; and sending the additional confirmation from the provisioning agent to the router, wherein the router deletes the first unique password after receiving the confirmation.

8. The method of claim 7, wherein the router generates the additional notification based on a mismatch between the first device identifier and a second device identifier of the potentially malicious device.

9. The method of claim 7, wherein the router generates the additional notification based on a usage of the WLAN associated with the first unique password and the first device identifier.

10. One or more non-transitory computer readable media storing instructions that, when executed by one or more processors, cause the one or more processors to perform the steps of:

receiving, at a provisioning agent from a first device, a first request to access a wireless local area network (WLAN) of a router, wherein the provisioning agent is separate from the router, wherein the first request comprises a first device identifier of the first device, wherein the provisioning agent is within a first wireless range of the first device and a second wireless range of the router, and wherein the provisioning agent and the first device are different devices;

displaying, at an interface of the provisioning agent, a notification requesting confirmation by a user that the first device is allowed to access the WLAN of the router;

requesting, after receiving the confirmation from the user that the first device is allowed to access the WLAN of the router at the provisioning agent from an authentication server, a first unique password generated by the authentication server for the first device to access the WLAN of the router, wherein the first unique password is an alphanumeric sequence unique to the first device or a randomly-generated token unique to the first device;

receiving, at the provisioning agent from the authentication server, the first unique password generated by the authentication server for the first device;

sending, from the provisioning agent to the router, the first unique password and the first device identifier;

receiving, at the provisioning agent from the router, a first indication that the router has verified that the first unique password is correct; and sending, from the provisioning agent to the first device, the first unique password responsive to the first request to access the WLAN, wherein the first unique password allows the first device to be automatically authenticated with the router.

11. The one or more non-transitory computer readable media of claim 10, wherein the provisioning agent is a client system of the user.

12. The one or more non-transitory computer readable media of claim 11, wherein:

the user is logged into an online social network via an application running on the client system; and the authentication server is a server of the online social network.

13. The one or more non-transitory computer readable media of claim 10, wherein the first device identifier is a media access control address.

14. The one or more non-transitory computer readable media of claim 10, wherein the steps further comprise receiving, at the provisioning agent from the router, a confirmation from the authentication server that the first unique password is correctly paired with the first device identifier.

15. The one or more non-transitory computer readable media of claim 10, wherein the steps further comprise:

receiving, at the provisioning agent from a second device via a wireless signal, a second request to access the WLAN of the router, wherein the second request comprises a second device identifier of the second device, wherein the provisioning agent is within a third wireless range of the second device and the router, and wherein the provisioning agent and the second device are different;

requesting, at the provisioning agent from the authentication server, a second unique password for the second device to access the WLAN of the router, wherein the second unique password is uniquely generated by the authentication server specifically and exclusively for the second device;

receiving, at the provisioning agent from the authentication server, the second unique password for the second device;

sending, from the provisioning agent to the router, the second unique password and the second device identifier;

receiving, at the provisioning agent from the router, a second indication that the router has verified the second unique password with respect to the second device identifier with the authentication server, wherein the router stores the second device identifier in association with the second unique password; and sending, from the provisioning agent to the second device via the wireless signal, the second unique password responsive to the second request to access the WLAN, wherein the second unique password allows the second device to be automatically authenticated with the router.

16. A system comprising:

a memory storing instructions related to a provisioning agent; and one or more processors that are coupled to the memory and execute the instructions to:

receive, at the provisioning agent from a first device, a first request to access a wireless local area network (WLAN) of a router, wherein the provisioning agent is separate from the router, wherein the first request comprises a first device identifier of the first device, wherein the provisioning agent is within a first wireless range of the first device and a second wireless range of the router, and wherein the provisioning agent and the first device are different devices;

display, at an interface of the provisioning agent, a notification requesting confirmation by a user that the first device is allowed access to the WLAN of the router;

request, after receiving the confirmation from the user that the first device is allowed to access the WLAN of the router at the provisioning agent from an authentication server, a first unique password generated by the authentication server for the first device to access the WLAN of the router, wherein the first unique password is an alphanumeric sequence unique to the first device or a randomly-generated token unique to the first device;

receive, at the provisioning agent from the authentication server, the first unique password generated by the authentication server for the first device;

send, from the provisioning agent to the router, the first unique password and the first device identifier;

receive, at the provisioning agent from the router, an indication that the router has verified that the first unique password is correct; and send, from the provisioning agent to the first device, the first unique password responsive to the first request to access the WLAN, wherein the first unique password allows the first device to be automatically authenticated with the router.

17. The system of claim 16, wherein the provisioning agent is a client system of the user and the user is logged into an online social network via an application running on the client system.

18. The system of claim 16, wherein the one or more processors execute the instructions to receive, at the provisioning agent from the router, a confirmation from the authentication server that the first unique password is correctly paired with the first device identifier.

* * * * *